July 20, 1943.  C. B. LEE ET AL  2,324,521

LUMINOUS MARKER

Filed Nov. 25, 1941

Clarence B. Lee
Clarence W. Wallhausen
INVENTORS

BY

ATTORNEYS

Patented July 20, 1943

2,324,521

UNITED STATES PATENT OFFICE 2,324,521

LUMINOUS MARKER

Clarence B. Lee and Clarence W. Wallhausen, Morristown, N. J., assignors to United States Radium Corporation, New York, N. Y., a corporation of Delaware Application November 25, 1941, Serial No. 420,334

9 Claims. (Cl. 250—73)

This invention is concerned with luminous markers. It provides an elongated luminous marker that is flexible, extremely durable and which may be coiled into a small compact bundle.

To facilitate troop movements, there is need for a marker that can be seen clearly in the dark and which may be strung along a route to be followed. We have developed a marker which fulfills these requirements and which is extremely durable and rugged. It comprises a flexible tube of organic plastic material of relatively high tensile strength and translucency coated on the inside with a paint comprising a luminescent pigment (self-luminous or fluorescent) in a flexible binder, the tube and binder being sufficiently flexible and the relationship of the tube length to its cross-section being such that the marker may be formed into a coil of relatively small diameter.

The tube preferably is of small diameter, say, $\frac{3}{16}$" with a bore such that the wall is about $\frac{1}{16}$" thick. A variety of organic plastic materials may be employed to form the tube provided that they are resistant to the atmosphere in which the marker is to be exposed, and provided further that they are not attacked by the luminous paint employed as the inside coating.

Although either self-luminous or fluorescent pigments may be employed, the self-luminous pigments are much to be preferred for military use, for the marker containing such pigments will glow without the use of external stimuli, for example ultra-violet light. Consequently, for military use the marker of our invention should be made of a plastic that is resistant to the action of water and soil acids and also resistant to the action of rays and emanations given off by the radio-active substance in the pigment.

A number of plastics are substantially water and soil-acid proof and are not affected substantially by radio-active pigments, for example radio-active zinc sulfide. Among such plastics is polystyrene. However, in the preferred form of military markers of our invention, we prefer to employ tubes made of plastic sold under the trade name "Saran" by the Dow Chemical Company. This material is relatively translucent and of such a nature that it tends to diffuse light given off by the radio-active material with which the inside of the tube is coated. Moreover, it has extremely high tensile strength so that a tube of Saran of $\frac{3}{16}$" outside diameter with a wall about $\frac{1}{16}$" thick will bear a load of 600 lbs. Tubes made of this plastic do not absorb any appreciable proportion of water and are not deleteriously affected by even long exposure to the weather.

As indicated above, our preferred form of marker for military use comprises a tube coated on the inside with a relatively thin flexible layer of a self-luminous paint, for example radio-active zinc sulfide pigment in a flexible binder. The paint may be applied to the interior of the tube wall in any convenient manner, for example by introducing the paint into the tube in a relatively thin condition (due to the presence of a volatile vehicle) and rotating the tube about its axis so as to distribute the paint thoroughly over the inside surface. The binder which holds the pigment to the inside of the tube should be at least as flexible as the tube itself so that the interior coating will not chip when the tube is flexed.

In our preferred structure, both ends of the tube are sealed. Conveniently, the tube is sealed by a screw which is twisted into the end of the tube so that it cuts its own thread, the wall of the tube being prevented from expanding by means of a metal collet or sleeve on the outside.

The military marker of our invention is provided with linking or fastening means at both ends of the tube so that a plurality of tubes may be strung together to mark a long route. Thus, the screw employed to seal the end of the tube may be provided with an eye carrying a harness snap or other convenient fastening means.

For civilian use, say in advertising signs and the like, it is not necessary to employ fastening means on the ends of the tube, although it is desirable to seal the ends.

These and other features of our invention will be understood more thoroughly in the light of the following detailed description taken in conjunction with the accompanying drawing in which.

Figure 1:
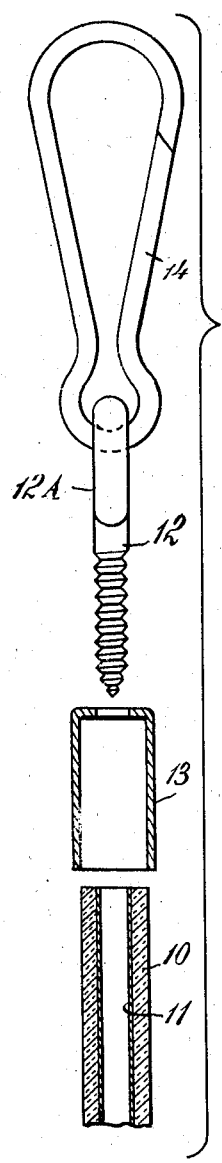
Fig. 1 is an assembly diagram showing the elements employed to form the fastening means on the end of the tube.
Figure 2:
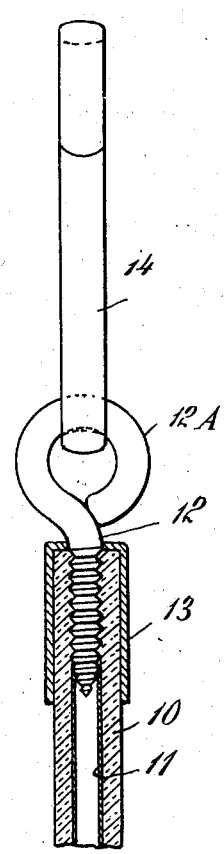
Fig. 2 shows the elements of Fig. 1 assembled.

Referring now to the drawing, it will be observed that the marker comprises a flexible tube 10, preferably of Saran or other reasonably translucent organic plastic that has high tensile strength and is weather-proof and resistant to deterioration under the influence of radio-active substances. This tube in its preferred form is about 3/16" in outside diameter with a bore about 3/32" in diameter. The inside wall of the tube is coated with a thin layer 11 of self-luminous zinc sulfide pigment dispersed in a flexible binder. The tube may be of any convenient length, say, 5 or even 500 feet and may be rolled into coils of relatively small diameter for transport from place to place.

The end of the tube is closed by means of an eyed screw 12 which is twisted into the tube so that it cuts its own thread, the tube being reinforced by means of a metal collet or sleeve 13. When the eyed screw is twisted into the end of the tube, the tube wall is forced against the collet so that a tight water-proof joint is formed.

Figure 3:
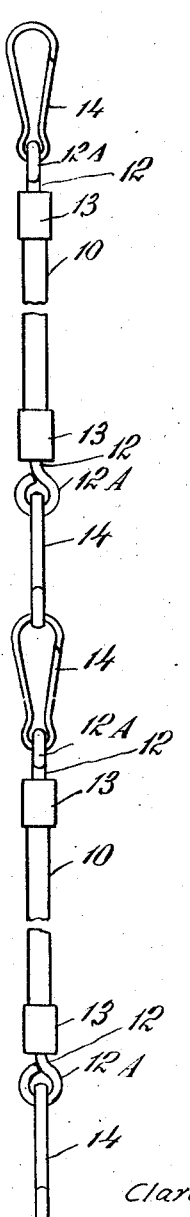
Fig. 3 illustrates the preferred form of military marker of our invention.
Figure 4:
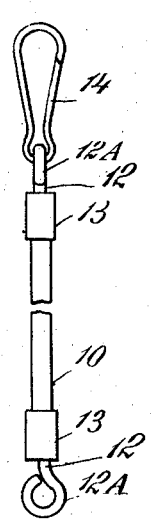
Fig. 4 illustrates a modification of the marker of Fig. 3.

In the preferred form of our device, the eyes 12A of the screws fastened to both ends of the tube are provided with harness snaps or clips 14 (see Fig. 3). The presence of harness clips on both ends of the tube facilitates joining a series of tubes together during night operations for in this way no situation can arise in which two eyes have to be joined together. If desired, however, the structure of Fig. 4 can be employed. In this case, one end of the tube is not provided with a harness clip but simply with an eye in which the harness clip of another tube is adapted to be snapped.

As we have indicated, the luminescent pigment is not necessarily self-luminous. For advertising purposes, markers containing fluorescent pigments may be used. Such pigments, for example synthetic willemite, glow under the influence of ultra-violet rays. Fluorescent pigments may also be used in military markers, but this requires the use of ultra-violet lamps, or the like, which may not always be available. Consequently, we prefer to employ a self-luminescent pigment, for example zinc sulfide made radio-active by the presence of a small proportion of a radio-active substance such for example as radium itself.

Any one of a great number of binders may be employed with pigments, provided that they are at least flexible as the tube itself and are compatible with the pigment. Conveniently, the binder may be a plastic similar in character to that of which the tube is made.

It is not necessary to employ a thick layer of paint on the inside of the tube. In fact, the use of a thick layer or a solid core in the tube is undesirable, since this makes the tube less flexible.

A variety of types of linking devices other than the harness clips and rings illustrated may be employed. However, this is a simple and foolproof type of linking device which, in practice, has proved to be very satisfactory. Sealing means other than that illustrated may also be employed but again the metal collet and the self-threaded screw are simple and cheap and result in a strong fastening.

In assembling the marker illustrated by the drawing, the tube is lined with luminescent paint and cut into suitable lengths. Thereafter the collets are slipped over the ends of the tube and the rings are screwed into the tubes to the depth of the collets, say, 3/8" to 1/2". As shown, the screws are slightly larger than the bore of the tube so that they cut their own threads.

When the markers are not used they may be coiled and stored. The markers are so flexible and at the same time so strong that they may be bent along almost any course, however tortuous.

Although the present field of application of our invention is largely military, our marker has a variety of applications outside the military sphere. Thus, it may be bent to form the letters of advertising signs, somewhat after the manner of so-called neon signs.

We claim:

1. A luminous marker comprising a flexible tube of organic plastic material of relatively high tensile strength and reasonable transparency coated on the inside with a paint comprising a luminescent pigment in a flexible binder, the tube and binder being sufficiently flexible and the relationship of the tube length to its cross-section being such that the marker may be formed into a coil of relatively small diameter.

2. A luminous marker comprising a flexible tube of organic plastic material of relatively high tensile strength and reasonable transparency coated on the inside with a paint comprising a self-luminous pigment in a flexible binder, the tube and binder being sufficiently flexible and the relationship of the tube length to its cross-section being such that the marker may be formed into a coil of relatively small diameter.

3. A luminous marker comprising a flexible tube of organic plastic material of relatively high tensile strength and reasonable transparency coated substantially throughout on the inside with a paint comprising a fluorescent pigment in a flexible binder, the tube and binder being sufficiently flexible and the relationship of the tube length to its cross-section being such that the marker may be formed into a coil of relatively small diameter.

4. A luminous marker comprising a flexible tube of organic plastic material of relatively high tensile strength and reasonable transparency coated substantially throughout on the inside with a paint comprising a luminescent pigment in a flexible binder, at least one end of the tube being closed by a screw threaded into the bore thereof, the tube and binder being sufficiently flexible and the relationship of the tube length to its cross-section being such that the marker may be formed into a coil of relatively small diameter.

5. A luminous marker comprising a flexible tube of organic plastic material of relatively high tensile strength and reasonable transparency coated substantially throughout on the inside with a paint comprising a luminescent pigmment in a flexible binder, at least one end of the tube being closed by a screw threaded into the bore thereof, a reinforcing sleeve being disposed around said end, the tube and binder being sufficiently flexible and the relationship of the tube length to its cross-section being such that the marker may be formed into a coil of relatively small diameter.

6. A luminous marker comprising a flexible tube of organic plastic material of relatively high tensile strength and reasonable transparency coated on the inside with a paint comprising a luminescent pigment in a flexible binder, at least one end of the tube being closed by a screw threaded into the bore of the tube, and a linking means fastened to the outside end of the screw, the tube and binder being sufficiently flexible and the relationship of the tube length to its cross-section being such that the marker may be formed ino a coil of relatively small diameter.

7. A luminous mamrker comprising a flexible tube of organic plastic material of relatively high tensile strength and reasonable transparency coated on the inside with a paint comprising a luminescent pigment in a flexible binder, the binder being at least as flexible as the tube, the tube and binder being sufficiently flexible and the relationship of the tube length to its cross-section being such that the marker may be formed ino a coil of relatively small diameter.

8. A luminous marker comprising a flexible tube of organic plastic material of relatively high tensile strength and reasonable tranparency coated on the inside with a paint comprising a luminescent pigment in a flexible binder, both ends of the tube being closed by eyed screws threaded into the bore thereof, with a clip attached to at least one of the eyes, the tube and binder being sufficiently flexible and the relationship of the tube length to its cross-section being such that the marker may be formed into a coil of relatively small diameter.

9. A luminous marker comprising a flexible tube of organic plastic material of relatively high tensile strength and reasonable transparency coated on the inside with a paint comprising a luminescent pigment in a flexible binder, at least one end of the tube being provided with a sleeve, and a screw threaded into the bore of the tube within the sleeve, the tube and binder being sufficiently flexible and the relationship of the tube length to its cross-section being such that the marker may be formed into a coil of relatively small diameter.

CLARENCE B. LEE.
CLARENCE W. WALLHAUSEN.